United States Patent [19]

Teich

[11] Patent Number: 4,763,868
[45] Date of Patent: Aug. 16, 1988

[54] LEVELLING COMBINATION WHEEL AND LEG ASSEMBLY FOR A REFUSE COMPACTOR

[75] Inventor: Daniel E. Teich, Boyle County, Ky.

[73] Assignee: Whirlpool Corporation, Benton Harbor, Mich.

[21] Appl. No.: 920,333

[22] Filed: Oct. 17, 1986

[51] Int. Cl.⁴ .............................................. A47B 91/00
[52] U.S. Cl. .................................. 248/558; 248/677;
248/188.2; 248/188.8; 248/207; 16/19; 16/33;
16/18 R
[58] Field of Search ..................... 248/558, 677, 188.2,
248/207, 188.8, 188.9, DIG. 11, 649; 16/19, 30,
32, 33, 18 R; 100/100

[56] References Cited

U.S. PATENT DOCUMENTS

| | | | |
|---|---|---|---|
| 901,636 | 10/1908 | McIntire | 16/32 |
| 1,136,915 | 4/1915 | Adams | 16/32 |
| 1,520,116 | 12/1934 | Buchter . | |
| 2,683,277 | 7/1954 | Bernaerts . | |
| 2,698,454 | 1/1955 | Meyer | 16/32 |
| 2,793,467 | 5/1957 | Matter . | |
| 2,828,578 | 4/1958 | McCabe . | |
| 2,932,122 | 4/1960 | Matter . | |
| 2,979,857 | 4/1961 | Longbotham . | |
| 3,441,974 | 5/1969 | Dean | 16/19 |
| 3,753,400 | 8/1973 | Miller . | |
| 3,844,578 | 10/1974 | Matyskella | 16/19 |
| 3,858,270 | 1/1975 | Crowe | 16/29 |
| 4,339,842 | 7/1982 | Fontana et al. . | |
| 4,503,943 | 3/1985 | Tsukui . | |
| 4,518,142 | 5/1985 | Sulcek et al. . | |

FOREIGN PATENT DOCUMENTS

| | | | |
|---|---|---|---|
| 1106044 | 2/1954 | Fed. Rep. of Germany ... | 248/188.8 |
| 1348631 | 3/1974 | United Kingdom | 16/19 |

Primary Examiner—J. Franklin Foss
Assistant Examiner—Robert A. Olson
Attorney, Agent, or Firm—Lowe, Price, LeBlanc, Becker & Shur

[57] ABSTRACT

A rotatable disk mounted to a baseplate at each corner of a refuse compactor pivots between a first orientation having a horizontal axis of rotation for operation as a wheel and a second orientation having a vertical axis of rotation for operation as a leg. The disk is mounted on a bearing support that interfits with elongated slots formed in the baseplate to enable the height of any corner of the compactor, independent of the orientation of the disk, to be adjusted. In one embodiment, the bearing support comprises a nylon block into which an axle of the rotatable disk is snap-fit. In another embodiment, the bearing support comprises an angle bracket to which the axle is welded.

31 Claims, 2 Drawing Sheets

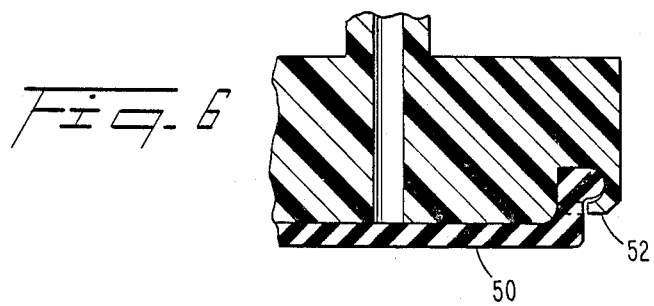
Fig. 6
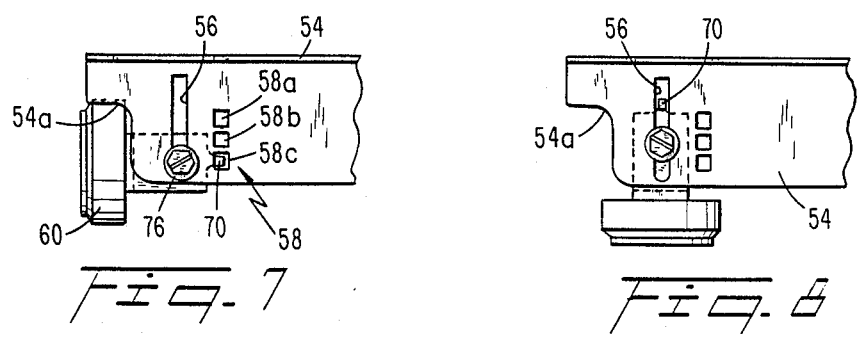
Fig. 7
Fig. 8
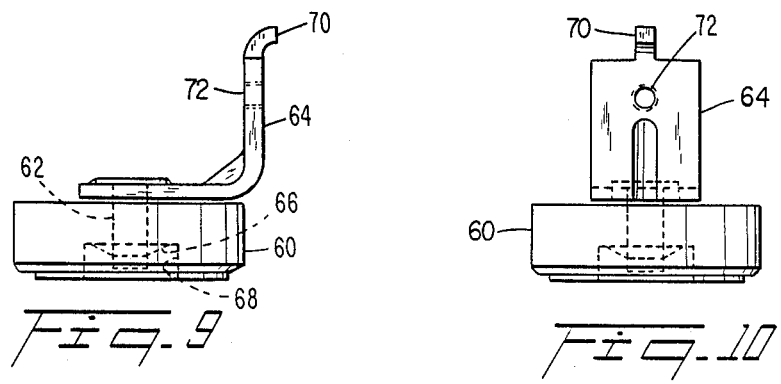
Fig. 9
Fig. 10
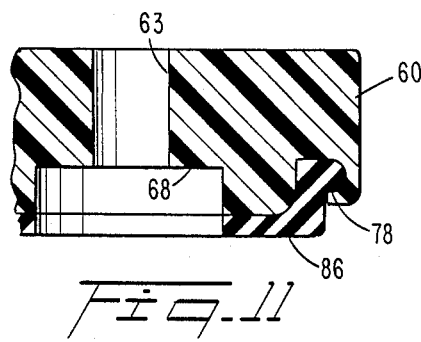
Fig. 11

LEVELLING COMBINATION WHEEL AND LEG ASSEMBLY FOR A REFUSE COMPACTOR

BACKGROUND OF THE INVENTION

1. Field of the Invention

This invention relates generally to appliance supports, and more particularly to a levelling wheel and leg assembly for refuse compactors.

2. Description of the Prior Art

In one form of refuse compactor, the appliance cabinet is installed under-the-counter or in a similar confined space. The appliance is positioned for service by rolling it on a pair of rear wheels into position under the counter, then levelled by adjusting the lengths of a pair of legs at the front corners of the cabinet. The appliance thus requires two different kinds of cabinet supports, i.e., wheels and legs, which increases production costs.

Combination wheels and legs for various apparatus are known to exist. In U.S. Pat. No. 2,683,277, for example, a footplate pivots on a cross member between a first orientation having a horizontal axis of rotation for operation as a wheel and a second orientation having a vertical orientation for operation as a leg. The foot plate is secured in the first orientation by a manually operated latch. This device is relatively complex and there is no means for adjusting its length so that it cannot be used for appliance levelling.

Mechanisms provided heretofore for controlling the mounting disposition of an appliance wheel or leg include screws, levers, ratchets or cams as provided, for example, in U.S. Pat. Nos. 4,158,142; 3,753,400; 3,844,578 and 3,858,270. These mechanisms, however, besides being relatively complex, do not operate as both an adjustable wheel and adjustable leg.

Summary of the Invention

An object of the invention is to provide a combination adjustable wheel and leg assembly suitable for application to a household appliance.

Another object is to provide a new and improved support for a refuse compactor that is operative alternatively as a wheel or leg.

A further object is to provide an appliance support that is economically manufactured and easy to install and operate.

A still further object is to provide an appliance support that is rugged and reliable.

The above and other objects are satisfied in accordance with the invention by a rotatable member mounted in a predetermined location on a baseplate at each lower corner of the appliance. The rotatable member is pivotable between and secured into a first orientation having a horizontal axis of rotation for operation as a wheel and a second orientation having a vertical axis of rotation for operation as a leg. Means are provided for adjusting the location of the rotatable member on the baseplate to provide levelling of the appliance.

Preferably, the rotatable member is mounted to the baseplate by a bearing support which in accordance with one embodiment comprises a block and in another comprises an angle bracket. In each, the baseplate contains first and second slots within which the bearing support is adjustably mounted. A screw extending through one of the slots into the bearing support secures the support and baseplate together. A tab formed on the bearing support interfits with either one of the slots in the baseplate to provide the two orientations of the rotatable member as a wheel or as a leg.

In accordance with another aspect of the invention, the rotatable member is formed with an axle that snap-fits to the bearing support. Preferably, the rotatable member is in the form of a nylon disk or disk wheel and has an integral axle.

In accordance with a further aspect of the invention, one of the slots in the baseplate is formed as a series of small apertures that receive the locating tab of the bearing support to provide discrete levelling heights for the appliance.

Still other objects and advantages of the present invention will become readily apparent to those skilled in this art from the following detailed description, wherein only the preferred embodiments of the invention are shown and described, simply by way of illustration of the best modes contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 6 is a cross-sectional view of the rotatable member of the first embodiment, with a rubber insert therein;

FIG. 7 is a front view of a combination wheel and leg assembly in accordance with a second embodiment of the invention, with the rotatable member oriented to operate as a wheel;

FIG. 8 corresponds to FIG. 7, with the rotatable member oriented to operate as a leg;

FIG. 9 is a side view of a rotatable member and support bearing in accordance with the second embodiment;

FIG. 10 is an end view corresponding to FIG. 9; and

FIG. 11 is a cross-sectional view of the rotatable member in accordance with the second embodiment.

DETAILED DESCRIPTION OF THE PREFERRED EMBODIMENTS

Figure 1:
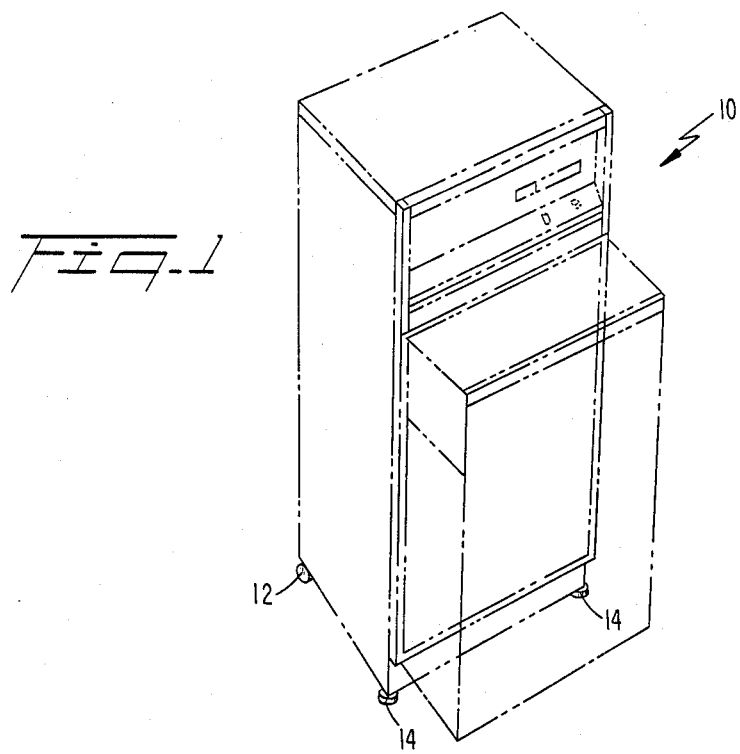
FIG. 1 is a perspective view of a refuse compactor having combination wheel and leg supports embodying the invention.

In FIG. 1, a refuse compactor 10, which may be adapted for installation in an under-the-counter space of a kitchen counter is shown. The appliance 10 is adapted to be moved along a supporting surface on wheels 12 at the rear corners of the appliance and then fixed in position and levelled by legs 14.

Figure 2:
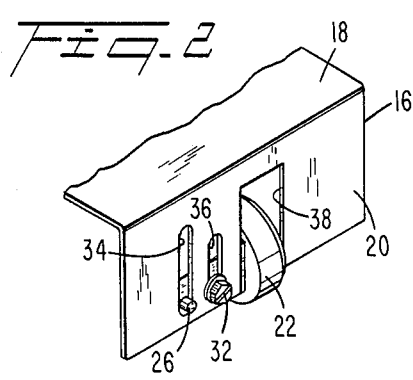
FIG. 2 is a perspective view of one embodiment of the invention, with the rotatable member oriented to operate as a wheel.

The invention is concerned with a combined wheel and leg assembly that is operative alternatively as wheels 12 or legs 14 and in either case is vertically adjustable for appliance levelling. Thus, in accordance with one embodiment of a combined wheel and leg assembly shown in FIGS. 2–6, a baseplate 16 (FIGS. 2 and 3) of structural steel formed with an L-shaped section has an upper surface 18 welded or otherwise suitably secured to the lower surface of the appliance and a front, downwardly extending, surface 20 supporting a rotatable member 22, preferably in the form of a disk wheel or disk, as shown. The disk 22, in turn, is journaled in a bearing support block 24, shown in FIGS. 4 and 5, that is positioned on the baseplate 16 with either a horizontal axis of rotation of the disk 22 so that the disk operates as a wheel, as shown in FIG. 2, or a vertical axis of rotation, shown in FIG. 3, so that the disk operates as a leg.

Figure 5:
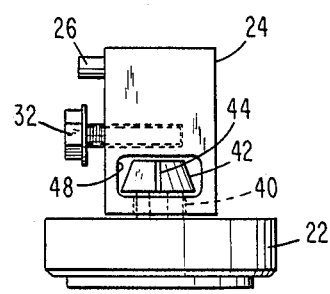
FIG. 5 is a side view corresponding to FIG. 4, with a mounting screw inserted in the support bearing.

The block 24, which preferably is made of nylon, has an integral tab 26 extending from one face 28 of the block, and an approximately centrally located, threaded bore 30 in the same face to receive a screw 32 (FIG. 5).

The surface 20 of baseplate 16 contains a pair of parallel slots 34 and 36 spaced apart from each other by a distance corresponding to the distance between tab 26 and threaded bore 30 on bearing support block 24. The tab 26 is adapted to interfit with slot 34, as shown in FIG. 2, and with screw 32 mounted to block 24 through slot 36, the disk 22 is oriented on a horizontal axis of rotation to operate as a wheel. An opening 38 within the surface 20 provides clearance for the disk 22 in this position. The vertical position of the disk on the baseplate 16, and hence the height of the corner of the appliance at which the combination wheel and leg assembly is located, is established by sliding the bearing within slots 34 and 36 to the proper location, and then tightening the screw 32.

Figure 3:
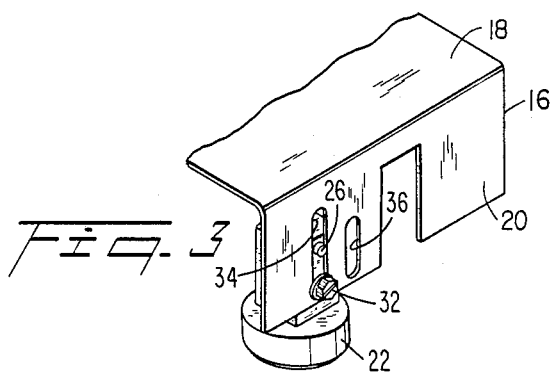
FIG. 3 is a perspective view of the first embodiment with the rotatable member oriented to operate as a leg.
Figure 4:
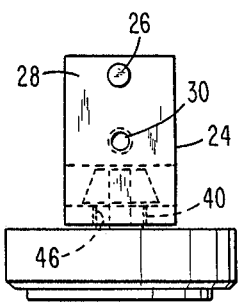
FIG. 4 is an end view of a rotatable member and support bearing, in accordance with the first embodiment.

To orient the assembly as a leg, the bearing support block 24 is pivoted by 90° into the position shown in FIG. 3. This is done by removing screw 32, rotating the block 24 clockwise about tab 26 and until bore 30 is in alignment with the same slot, and then reinserting the screw through slot 34 into bore 30. The vertical position of the leg on the baseplate is adjusted by sliding the assembly within the slot 34 to the proper position, and tightening the screw.

In the embodiment of FIGS. 2-6, the disk 22 preferably is formed of nylon with an integral, hollow axle 40 extending therefrom. At the end of axle 40 is a trapezoidal enlargement 42 having lateral or cross cuts 44 formed therein for resiliency. The axle 40 of disk 22 is adapted to extend into a bore 46 formed in one end of the bearing support block 24. A transverse opening 48, formed in the block 24, intersects the bore 46 to establish a region for retaining the enlarged portion 42 of the axle 40 therein. As the enlarged portion 42 is urged through the bore 46, it yields inwardly at cuts 44. When the enlarged portion reaches the opening 48 it springs open. This provides a "snap-fit" coupling between the disk 22 and bearing support block 24, with the disk 22 remaining free to rotate. The assembly is completed by a rubber hub or insert 50 retained within a lip 52 at the per-imeter of the disk 22, as shown in FIG. 6, to establish a high-friction, slip-free, surface for contact with the floor when the disk 22 is oriented in the position of FIG. 3 for operation as a leg.

In accordance with the second embodiment of the assembly, as shown in FIGS. 7-11, the baseplate is in the form of a piece of structural steel formed with an L-shaped section and having a front plate portion 54 extending downward from each corner of the compactor 10 (FIG. 7). The baseplate may be of rectangular shape or may advantageously have a rounded end portion removed as shown at 54a to facilitate access to the disk 60. Formed within the plate portion 54 are a pair of parallel slots 56 and 58 that correspond generally to slots 36 and 34, respectively, in the embodiment of FIGS. 2-6. In FIG. 7, however, slot 56 is slightly longer than slot 58, and slot 58 is formed of a series of smaller, linearly aligned, slots 58a-58c.

In FIGS. 9 and 10, disk 60 is journaled on a weld stud 62 extending from one face of an angle bracket 64 through bore 63 in the disk. The disk 60 is retained to the weld stud 62 by a push nut 66 within a recess 68 in the disc. At the opposite end of the angle bracket 64 is an arcuate locating tab 70 corresponding in function to tab 26 of FIG. 4. A threaded bore 72 (FIG. 10) receives a tightening screw 76 for mounting the assembly to the plate 54.

Referring to FIG. 7, with locating tab 70 within one of the openings 58a-58c and screw 76 mounted into the bore 72 of angle bracket 64 through slot 56, the disk 60 has a horizontal axis of rotation to operate as a wheel. The height of the wheel is adjusted by loosening screw 76, sliding the assembly until tab 70 is in registration with one of the other openings 58a, 58b and then tightening the screw. To convert the assembly into a leg, the screw is loosened and the assembly pivoted counterclockwise about the screw until tab 70 is located within slot 56, as shown in FIG. 8. The height of the leg is now established by loosening the screw 76, sliding the assembly in slot 56 to the proper position with tab 70 acting as a guide, and then tightening the screw.

The disk 60 preferably is formed of nylon. To provide a slip-free surface when the disk 60 is oriented as in FIG. 8 to operate as a leg, a rubber insert 86 (FIG. 11) is retained on the face of the disk by a lip 78 of the disk in the manner shown.

There has accordingly been described a support for a refuse compactor or other appliance that is operative selectively as a wheel or as a leg, and in either case, is adjustable in height to permit levelling of the appliance. The assembly is economical, rugged, easy to manufacture, install and operate. The lifetime of the assembly is expected to be at least as great as that of the appliance to which it is installed; the rotatable disk 22 or 60, which is the only component subject to wear, is readily replaceable.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. For supporting an appliance cabinet on a horizontal surface by attachment to a baseplate extending from a lower portion of the cabinet, a combination levelling wheel and leg assembly, comprising:

a baseplate attachable to a lower portion of said cabinet and having a planar extendable therefrom;

a rotatable member mounted to a predetermined location on said planar portion of said baseplate;

means for pivoting said rotatable member on said planar portion of said baseplate between a first orientation having a horizontal axis of rotation for operation as a wheel, wherein the wheel intersects the plane of the planar portion, and a second orientation having a vertical axis of rotation for operation as a leg;

means for securing the rotatable member to said planar portion of said baseplate selectively in said first and second orientations; and means for adjusting said predetermined location on said planar portion of said baseplate for levelling the cabinet.

2. The combination of claim 1, including a bearing support for said rotatable member, and wherein said adjusting means includes means for adjustably mounting said bearing support to said planar portion of said baseplate.

3. The combination of claim 2, wherein said adjusting means comprises a first slot formed in said planar portion of said baseplate and wherein said pivoting means includes means for slidably retaining a first portion of said bearing support in said first slot.

4. The combination of claim 3, wherein said adjusting means further comprises a second slot formed in said planar portion of said baseplate parallel to said first slot and wherein said securing means includes means for retaining a second portion of said bearing support selectively in said first and second slots to establish, respectively, said second and first orientations of said rotatable member.

5. The combination of claim 4, wherein said securing means further includes a tab on said bearing support, positioned for interfitting within a portion of said first slot for levelling.

6. The combination of claim 5, wherein said second slot is formed of a plurality of slots aligned linearly on said planar portion of said baseplate and wherein said tab interfits within any one of said plurality of slots.

7. The combination of claim 5, wherein said bearing support comprises an angle bracket and said tab extends from one end of said angle bracket.

8. The combination of claim 7, wherein said tab is arcuate to extend into said second slot within said baseplate.

9. The combination of claim 5, wherein said bearing support comprises a block and said tab extends from one face of said block.

10. The combination of claim 5, wherein said pivoting means comprises a screw extending through said first slot of said baseplate into said bearing support.

11. The combination of claim 7, wherein said pivoting means comprises a screw extending through said first slot of said baseplate into said angle bracket.

12. The combination of claim 2 including means for releasably mounting said rotatable member to said bearing support.

13. The combination of claim 9, including means for releasably mounting said rotatable member to said block.

14. The combination of claim 13, wherein said rotatable member includes an axial member extending therefrom and a first surface of said block includes an opening formed therethrough for receiving said axial member.

15. The combination of claim 14, wherein said axial member is resilient, said axial member being formed to snap-fit into said opening.

16. The combination of claim 15, wherein said block contains a through-slot formed in a second surface of said block adjacent said first surface, and a resilient portion of said axial member includes an enlargement intersecting said opening and said through-slot in said block.

17. The combination of claim 15, wherein said axial member contains a cross cut to form said resilient portion.

18. The combination of claim 4, wherein said planar portion of said baseplate has a third slot formed therein parallel to said first and second slots for providing clearance for said rotatable member in said first orientation thereof.

19. The combination of claim 9, wherein said block is formed of nylon.

20. The combination of claim 9, wherein said tab is integral with said block.

21. The combination of claim 1, wherein a face of said rotatable member has a surface formed of a high friction material.

22. The combination of claim 21, wherein said rotatable member is formed of nylon and said high friction surface comprises a rubber insert.

23. The assembly of claim 1, wherein said rotatable member is disk-shaped.

24. For supporting and levelling a refuse compactor on a horizontal surface, a combination wheel and leg assembly, comprising;

a baseplate attachable to each corner of a lower surface of said compactor, said baseplate having first and second parallel slots formed therein;

a rotatable member assembly pivotally mounted to each said baseplate, said rotatable member assembly including a rotable member and a bearing support for said rotatable member, one portion of said bearing supportin having a tab for extending into either one of said first and second slots and another portion for receiving a screw extending through either one of said first and second slots, whereby when said tab and said screw are in different slots within said baseplate, said rotatable member is oriented to have a horizontal axis of rotation to operate as a wheel and when said tab and said screw are in a common slot within said baseplate, said rotatable member is oriented to have a vertical axis of rotation to operate as a leg.

25. The assembly of claim 24, wherein said bearing support comprises a block, with said tab and a threaded aperture for receiving said screw being formed in one face of said block.

26. The assembly of claim 24, wherein said bearing support comprises a block having an aperture formed therein, and having an axle extending from said rotatable member shaped to snap fit into said aperture.

27. The assembly of claim 24, wherein said baseplate has third slot formed therein to provide clearance for said rotatable member oriented to have said horizontal axis of rotation.

28. The assembly of claim 24, wherein said second slot is formed of a plurality of slots aligned linearly to provide discrete wheel heights for compactor levelling.

29. The assembly of claim 24, wherein said bearing support comprises an angle bracket, said tab extending from one end of said bracket.

30. The assembly of claim 24, wherein said rotatable member is disk-shaped.

31. For supporting and levelling a refuse compactor on a horizontal surface, a combination comprising;

a plurality of baseplates respectively attachable at individual corners of a lower surface of said compactor, said baseplates having first and second parallel slots formed therein;

a rotatable member assembly pivotally mounted to each said baseplate, said rotatable member assembly including a rotatable member and a bearing support for said rotatable member, one portion of said bearing support having a tab for extending into either one of said first and second slots and another portion for receiving a screw extending through either one of said first and second slots, whereby when said tab and said screw are in different slots within said baseplae said rotatable member is oriented to have a horizontal axis of rotation to operate as a wheel and when said tab and said screw are in a common slot within said baseplate said rotatable member is oriented to have a vertical axis or rotation to operate as a leg.

* * * * *